United States Patent [19]

Sandefur et al.

[11] Patent Number: 4,802,888

[45] Date of Patent: Feb. 7, 1989

[54] DRY DYESTUFF POWDERS WITH ENHANCED WATER SOLUBILITY

[75] Inventors: Charles W. Sandefur; Thomas J. Thomas, both of Summerville, S.C.

[73] Assignee: Mobay Corporation, Pittsburgh, Pa.

[21] Appl. No.: 117,856

[22] Filed: Nov. 6, 1987

[51] Int. Cl.$^4$ ............................................. C09B 67/42
[52] U.S. Cl. ............................................. 8/524; 8/937
[58] Field of Search ................................... 8/524, 937

[56] References Cited

U.S. PATENT DOCUMENTS

| | | | |
|---|---|---|---|
| 3,305,539 | 2/1967 | Feeman | 260/150 |
| 3,948,599 | 4/1976 | Irmiger et al. | 8/79 |
| 3,963,418 | 6/1976 | Tullio | 8/41 B |
| 4,014,646 | 3/1977 | Tullio | 8/39 R |
| 4,110,073 | 8/1978 | Mollet et al. | 8/85 |
| 4,260,391 | 4/1981 | Lacroix | 8/519 |
| 4,314,815 | 2/1982 | Mollet | 8/524 |
| 4,328,220 | 5/1982 | Abel et al. | 424/226 |
| 4,465,491 | 8/1984 | Balliello et al. | 8/524 |
| 4,468,230 | 8/1984 | Thomas et al. | 8/528 |
| 4,487,610 | 12/1984 | Mausezahl | 8/524 |
| 4,567,171 | 1/1986 | Mangum | 514/150 |
| 4,673,410 | 6/1987 | Sandefur et al. | 8/528 |

FOREIGN PATENT DOCUMENTS 1497666 1/1978 United Kingdom .

Primary Examiner—John F. Niebling
Assistant Examiner—Isabelle Rodriguez
Attorney, Agent, or Firm—Joeseph C. Gil; Aron Preis; Richard E. L. Henderson

[57] ABSTRACT

The present invention is concerned with improving the solubility of anionic water soluble dyestuff powders. The solubility of these powders particularly in cold water, is enhanced by adding (i) a chelating agent which has at least two free acid groups and (ii) a Lewis base in an amount sufficient to bring the pH of the water solution of the powder to a value of about 7–10.

9 Claims, No Drawings

DRY DYESTUFF POWDERS WITH ENHANCED WATER SOLUBILITY

FIELD OF THE INVENTION

The invention concerns dyestuff and more particularly a water solution of an anionic dyestuff.

SUMMARY OF THE INVENTION

The present invention is concerned with improving the solubility of anionic water soluble dyestuff powders. The solubility of these powders particularly in cold water, is enhanced by adding (i) a chelating agent which has at least two free acid groups and (ii) a Lewis base in an amount sufficient to bring the pH of the water solution of the powder to a value of about 7-10.

BACKGROUND OF THE INVENTION

The concentrated dye solutions of certain anionic dyes have been discussed in U.S. Pat. Nos. 3,963,418 and 4,014,646. In these cases high dye solubility in an aqueous medium is achieved by the use of an organic cosolvent and the avoidance of sodium cations. The stability of these solutions to dilution with hard water is assured by the addition of certain carboxylic acid bearing chelating agents to sequester those metal ions such as calcium and magnesium whose presence in hard water causes precipitation of the dissolved dye. In order to avoid introducing sodium ions it is suggested that these chelating agents be added in their free acid forms.

The use of the free acid forms of chelating agents to form metal complex dyes, particularly trivalent chromium complexes, has been discussed in U.S. Pat. No. 3,305,539. Although it is indicated that the chelate enhances solubility, it is readily apparent from the sodium hydroxide neutralization taught in the working examples that this enhanced solubility is associated with the formation of a particular structure complex and not the initial absence of sodium or potassium counterions.

Spray dried dye powder of selected anionic dyes diluted with substantial amounts of an anionic dispersant in which the cold water "solubility" has been enhanced by the addition of tetrasodium salt of ethylene diamine tetra acetic acid (EDTA) or glycine is disclosed in U.S. Pat. Nos. 4,465,491 and 4,487,610 and European Pat. No. 57,158. The "solubility" is evaluated by the presence or absence of residue on SS 1450 CV filter paper. Evidently, the "solutions" were not optically evaluated for the absence of observable particles. The filter paper is coarse enough to allow the passage of some particles which would be trapped by finer filter paper such as Whatman No. 2. What is actually obtained appears to be a readily "dispersible" powder, i.e. powder which forms a fine filterable dispersion on addition to limited quantities of cold water.

Also relevant in the present context are U.S. Pat. No. 4,567,171 which disclosed concentrated stable aqueous dispersions of anionic dyes, which contain certain dispersing agents, and U.S. Pat. No. 4,468,230 which relates to stable aqueous dispersions containing an anionic dispersant and an electrolyte. Further, U.S. Pat. No. 4,110,073 disclosed stable water dispersions of anionic dyestuff. U.S. Pat. No. 3,948,599 disclosed a water soluble dye formulation added to a melt of urea while U.S. Pat. No. 4,328,220 and GB 1,497,666 relates to a dye preparation having improved solubilities.

U.S. Pat. No. 4,673,410 which relates to anionic dye dispersion having enhanced cold water solubility upon dilution discloses adding to these water dispersion a chelating agent and a cation source.

DETAILED DESCRIPTION OF THE INVENTION

"Dry powders" in the present context means powders having a residual amount of water of less than 12% by weight, preferably less than 10% by weight. The dry dyestuff powders of the present invention comprise anionic dye powder, about 2 to about 12% of a chelating agent and a Lewis base in an amount sufficient to bring the pH of its water solution to about 7 to 10. In the present context, solution is distinguished over dispersion in that it is a single phase system as may be determined by filtration or microscopy. The dry dyestuff powder may also contain the requisite amount of known conventional components. Preferably the dyestuff powders contain between about 3 to 10 weight percent of the chelating agent. The amount of added Lewis base is controlled by the amount and state of the chelating agent and the acidity or basicity of the dye source used.

The dyestuff powder suitable in the present invention are anionic dyestuff classified as acid, direct and reactive and include those in the acid, direct and reactive usage classifications set forth in the *Colour Index*, Third Edition, published by the Society of Dyers and Colourists, and also recognized in Volume 8 of the Third Edition of the *Kirk-Othmer Encyclopedia of Chemical Technology* at pages 160 to 169. Those dyes bearing neutralized sulphonic acid groups are preferred and monosulphonated dyes are particularly preferred. Among the dyestuff powders suitable in the present invention are Direct Yellow 147, Direct Black 19, the acid dyestuff referred to as "Structure 1" having the formula

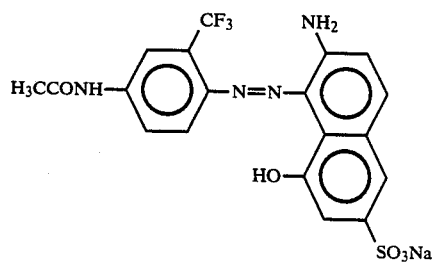

and the dyestuff referred to herein as Structure II, which conforms to

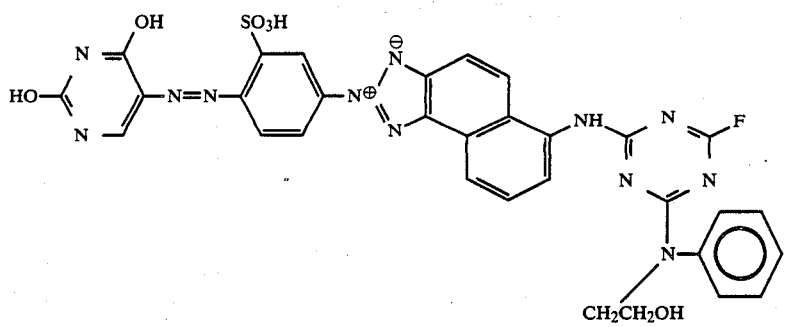

all of which are available in commerce.

The chelating agents suitable in the practice of the present invention include any of those known as such to the art which carry at least two free acid groups including carboxylic and phosphonic acid groups. An extensive description of suitable chelating agents can be found at page 339 et seq of Volume 5 of the Third Edition of *Kirk-Othmer Encyclopedia of Chemical Technology* which is incorporated herein by reference. The preferred chelating agents are those which carry at least two carboxyl or carboxylate groups. Among these mentioned may be made of maleic acid, citric acid, nitrilotriacetic acid, diethylene triamine pentaacetic acid and ethylenediamine tetra acetic acid, (commonly called EDTA). Suitable amino di-, tri- and tetracarboxylic acids are described in U.S. Pat. Nos. 4,465,491 and 4,487,610 incorporated herein by reference. The most preferred chelating agent is EDTA.

The Lewis base of the invention is selected from the group consisting of lithium hydroxide, an amine and amine carbonate. Suitable agents thus also include lithium hydroxide monohydrate, triethylamine and triethanolamine. Also included are the salts of weaker acids which will liberate lithium cations in the presence of a stronger acid, e.g. lithium carbonate while all amines are suitable secondary and tertiary amines are preferred.

The dyestuff may be prepared in a variety of ways, and the necessary ingredients may be added in any appropriate order. In a preferred technique the chelating agent and Lewis base are added and the formulation is then spray dried.

The dyestuff powder of the invention may optionally include a non-ionic surfactant.

The suitable non-ionic surfactants are well known to the art and include the non-ionogenic stabilizers described in U.S. Pat. No. 3,770,371, incorporated by reference herein, and the non-ionic dispersing agents described in U.S. Pat. No. 4,110,073, incorporated herein by reference. The preferred non-ionic surfactants are those ethoxylation products which do not carry the residues of other alkylene oxide such as propylene oxide. Particularly preferred are the ethoxylation products of low molecular weight alcohols or phenols, most especially ethyoxylated oleyl alcohol and nonylphenol. Ethoxylation degrees of between about 8 and 50, particularly between 9 and 25, are also especially preferred.

The dyestuff powders of the present invention preferably has a low content of sodium and potassium ions.

Many of the commercially available anionic dyes will impart a certain sodium ion content to their water solutions both because they are recovered from their synthesis baths as sodium salts and because they are isolated with some electrolytes such as sodium chloride and sodium sulphate.

The sodium and potassium electrolyte content of the dyestuff of the present invention should be minimized.

The dyestuff powders of the present invention may also include biocides which inhibit or suppress mold and/or bacterial growth. Suitable products include sodium pentachlorophenolate, condensation products of paraformaldehyde with aromatic alcohols, specifically benzyl alcohol and solutions of formaldehyde. These biocides may be present in amounts between 0 and 3 wt %, preferably in amounts between 0.05 and 0.5 wt %.

The dyestuff powders of the present invention may also include defoamers. Included among such agents are tributyl phosphate, alkyl succinic acid anhydride combined with aliphatic alcohol, methylpolysiloxane with $C_2$–$C_4$ alkoxy groups in combination with finely dispersed silica, and water insoluble organic liquids. Among the suitable water insoluble organic liquids are mineral oil, chlorinated mineral oil, liquid trichlorovinyl chloride polymers mixed with hydrophobic, finely dispersed silica and sulphonated petroleum.

The invention is further illustrated but is not intended to be limited by the following examples in which all parts and percentages are by weight unless otherwise specified.

EXAMPLES

Example 1

A sample of a dye conforming to Structure I was evaluated as to its solubility in cold water at a concentration of 1 g/liter. After standing overnight it did not dissolve.

The following mixture was prepared:

| | |
|---|---|
| Structure I | 1.00 gm |
| EDTA | 0.15 gm |
| Lithium Hydroxide | 0.07 gm |
| Surfactant | 0.01 gm |

The surfactant, an optional component which has no criticality in the present context was a non-ionic surfactant, surfonic N-95 from Texaco Chemicals Co. The mixture (1.23 g), was dissolved in 1 liter of cold water and remained in solution after standing overnight.

Example 2

A sample of Structure II powder was evaluated as above. The mixture of the powder in water (5.0 g of powder per 1 liter of water) did not dissolve. A mixture in accordance with the invention was prepared, consisting of

| | grams |
|---|---|
| Structure II | 5.0 |
| EDTA | 0.5 |
| Lithium hydroxide | 0.04 |
| Surfonic N-95 | 0.02 | was prepared. A sample of the mixture 5 PTE (Powder Type Equivalent) readily dissolved in 4 minutes in 1 liter of cold water.

Example 3

Similarly, 1 g of Direct Yellow 147 did not dissolve in 1 liter of water while a mixture of the dyestuff powder 1.0 g with 0.10 g of EDTA, 0.04 g of lithium hydroxide and 0.01 g of surfonic N-95 readily dissolved in cold water 6 minutes.

Example 4

The following series of experiments was conducted aimed at demonstrating the advantages of the present invention over the prior art—exemplified by European Patent Application No. 57,158—and over other closely related products.

A. A sample of dried, ground and uncut base, Direct Black 19 (25.0 gm) Sodium Sulfate (20.0 gm) and tetrasodium salt of EDTA (5.0 gm) were blended.

B. A mixture of Direct Black 19 base (25.0 g) and sodium sulfate (25.0 g) was prepared.

F. A paste of 150.0 g Direct Black 19 base, 120.0 g of sodium sulfate, 30 g of tetrasodium salt of EDTA and 244.7 g of water was milled (Sussmeyer, 750 ml of glass beads—0.3-0.5 mm—and 200 ml of water) for 5 minutes. The resulting particle size was determined by Culter Counter to be less than 5 microns. An additional 200 ml of water was used to rinse the paste from the mill. The paste was then spray dried 160° C. air inlet/80° C. air outlet.

H. a mixture of 25.0 g of Direct Black 19 base, 5.0 g of EDTA, 2.3 g of Lithium hydroxide and 17.7 g, of cerelose was prepared.

K. A mixture of 25.0 g of Direct Black 19 and 25.0 g of cerelose was prepared and dry blended.

The materials thus prepared were compared as to their relative rates of filtration through 0.45 and 0.2 micron filter discs, samples of 5 grams per liter of water were held for 24 hours with periodic shaking to eliminate rate of solution as a variable. 10 cc was then drawn up in a syringe and then filtered. The corresponding filtering times were as follows:

| Sample | Filtering Rate 0.45 micron | 0.2 micron |
|---|---|---|
| A | In 3 min. 4.2 cc(a) | — |
| B | Less than 2 cc(a) | — |
| H | 10 cc in 3 sec | 10 cc in 5 sec |
| H(1) | 10 cc in 3 sec | 10 cc in 5 sec |
| H(2) | 10 cc in 3 sec | 10 cc in 5 sec |
| H(3) | 10 cc in 7 sec | 10 cc in 25 sec |
| K | Less than 2 cc(a) | — |
| F | 10 cc in 51 sec | 3.8 cc(a) in 3 min |

(a)filtration stopped after the designated volume filtered through.
(1)at a concentration of 10 g/liter
(2)at a concentration of 15 g/liter
(3)at a concentration of 50 g/liter

Example 5

The solubility of Direct Yellow 147, as a function of adding any of several modifies was determined. A slurry of the dye was prepared containing the following components:

A. 10% glycine, pH adjusted to 8.0 with LiOH—no solution at the boil.

B. 10% Na salt of EDTA; no solution at the boil.

C. 10% tetralithium salt of EDTA, cloudy at boiling, precipitation upon cooling.

D. 10% acetic acid, pH adjusted to 8.0 with LiOH; not in solution at the boiling temperature.

E. 10% EDTA, pH adjusted to 8.0 with LiOH clear solution at the boil, no precipitation after standing at room temperature for 24 hours.

F. 10% oxalic acid, pH adjustment as above solubility and stability as in E.

G. 10% maleic acid, pH adjusted as above. Solubility and stability as in E.

H. 10% tartanic acid, pH adjusted as above; solubility and stability as in E.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising a dry dyestuff powder containing less than 12% by weight water wherein said composition comprises:
   (i) an anionic water soluble dye
   (ii) about 2 to about 12% of a chelating agent which is characterized in that it contains at least two free acid groups, said percents being relative to the weight of said powder and
   (iii) a sufficient amount of a Lewis base to bring the pH of a solution of said powder in water to about 7 to 10, selected from the group consisting of lithium hydroxide, amine and amine carbonate.

2. The composition of claim 1 wherein said chelating agent is present in an amount of about 3 to about 10 percent.

3. The composition of claim 1 wherein said chelating agent is characterized in that its free acid groups are carboxylic or phosphonic.

4. The composition of claim 1 wherein said chelating agent is ethylenediamine tetra acetic acid.

5. The composition of claim 1 wherein said dye is Direct Yellow 147.

6. The composition of claim 1 wherein said dye is Direct Black 19.

7. The composition of claim 1 wherein said dye conforms to

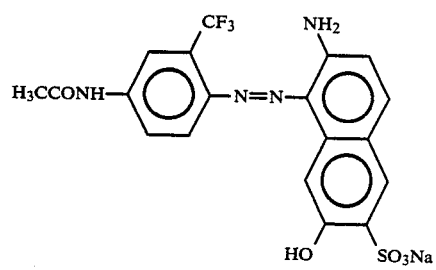

8. The composition of claim 1 wherein said dye conforms to

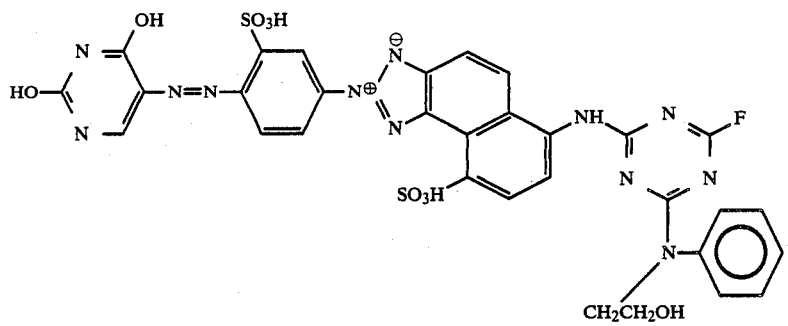

9. A composition comprising a dry dyestuff powder containing less than 10% by weight water wherein said composition comprises
(i) an anionic soluble dye
(ii) about 3 to 10 weight percent of ethylene diamine tetra acetic acid, said percent being relative to the weight of the powder and (iii) a sufficient amount of lithium hydroxide to bring the pH of an aqueous solution of said powder to about 7 to 10.

* * * * *